ns Patent [19] [11] 4,082,689
Heyden et al. [45] Apr. 4, 1978

[54] ANTIFOAM COMPOSITIONS AND PROCESS WITH BIS-α-HYDROXYAMINE DERIVATIVES

[75] Inventors: Rudi Heyden, Erkrath; Adolf Asbeck, Dusseldorf; Michael Eckelt, Dusseldorf; Manfred Petzold, Dusseldorf; Günter Uphues, Dusseldorf, all of Germany

[73] Assignee: Henkel Kommanditgesellschaft auf Aktien, Dusseldorf-Holthausen, Germany

[21] Appl. No.: 752,243

[22] Filed: Dec. 20, 1976

[30] Foreign Application Priority Data

Dec. 22, 1975 Germany .............................. 2558040

[51] Int. Cl.² ............................................ B01D 17/04
[52] U.S. Cl. ..................... 252/321; 252/358; 260/558 A; 260/553 A; 260/553 R; 260/561 A; 260/448.2 N
[58] Field of Search ............... 252/321, 358; 260/448.2 N, 553 R, 561 A, 553 A, 558 A

[56] References Cited
U.S. PATENT DOCUMENTS

| | | | |
|---|---|---|---|
| 2,580,411 | 1/1952 | Cusic | 260/561 A |
| 3,661,989 | 5/1972 | Chrobok | 260/553 A |
| 3,751,370 | 8/1973 | Stimberg et al. | 252/358 X |
| 3,808,262 | 4/1974 | Zeeh et al. | 260/553 R X |
| 3,884,947 | 5/1975 | Badin et al. | 260/448.2 N X |

*Primary Examiner*—Benjamin R. Padgett
*Assistant Examiner*—E. Suzanne Park

*Attorney, Agent, or Firm*—Hammond & Littell

[57] ABSTRACT

Antifoam compositions on the basis of a bis-α-hydroxyamine derivative of the formula

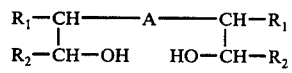

wherein A is —NHCO—$R_3$—CONH— or —NHCONH—$R_3$—NHCONH—, $R_1$ and $R_2$ are H or alkyl having 1 to 22 carbon atoms and the sum of the carbon atoms in $R_1$ and $R_2$, in each case, is from 8 to 22, $R_3$ is alkylene having 2 to 10 carbon atoms, phenylene, alkylphenylene having 1 to 3 carbon atoms in the alkyl or a polysiloxane of the formula

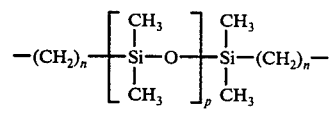

where $n = 2$ or 3 and $p = 2$ to 20; as well as the process of controlling foam in a foamable liquid by introducing therein an antifoam effective amount of said bis-α-hydroxyamine derivative. The antifoam bis-α-hydroxyamine derivatives are effective antifoam agents for most industrial purposes and are suitable for use in oil and latex paints.

17 Claims, No Drawings

ANTIFOAM COMPOSITIONS AND PROCESS WITH BIS-α-HYDROXYAMINE DERIVATIVES

FIELD OF THE INVENTION

The present invention relates to antifoam compositions which are useful in decreasing the tendency of solutions, liquors and dispersions in a large number of industrial processes to form foam, and for breaking foam which has already formed. The invention includes methods for inhibiting the formation of foam and for breaking foam by the use of said antifoam compositions. The invention is particularly directed towards oil and latex paints of decreased tendency to form foam when applied to surfaces in conventional manners.

BACKGROUND OF THE INVENTION

It is known that dispersions of certain solid materials in organic fluids or in water are effective antifoaming agents which are useful for defoaming industrial waste water and for inhibiting the formation of foam in papermaking white water, in the production of cellulose, in the production of dispersions of natural and synthetic film-forming materials (e.g., oil and latex paints) and pigment and dye dispersions, in biological processes, particularly fermentations, and in the manufacture of food. The antifoam agents referred to are finely divided solids of waxlike consistency, for example, pentaerythritol fatty acid esters, fatty acid monoglycerides, fatty acid polyglycol esters and the like. (See U.S. Pat. No. 2,715,613.)

OBJECTS OF THE INVENTION

An object of the present invention is the development of an antifoam composition of a liquid solution or dispersion containing from 1% to 25% by weight of a bis-α-hydroxyamine derivative of the formula

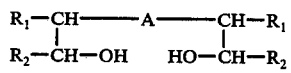

wherein A is a member selected from the group consisting of —NHCO—$R_3$—CONH— and —NHCONH—$R_3$—NHCONH—, $R_1$ and $R_2$ are members selected from the group consisting of hydrogen and alkyl having from 1 to 22 carbon atoms, at least one of $R_1$ and $R_2$ being alkyl and the sum of the carbon atoms in $R_1 + R_2$ is from 8 to 22, and $R_3$ is a bivalent member selected from the group consisting of alkylene having 2 to 10 carbon atoms, phenylene, alkylphenylene having from 1 to 3 carbon atoms in the alkyl and polysiloxane of the formula

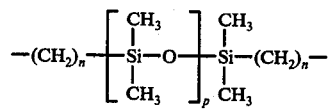

wherein $n$ is an integer from 2 to 3 and $p$ is an integer from 2 to 20.

Another object of the present invention is the development of a process for the control of foam in a foamable liquid comprising adding to said foamable liquid an antifoam effective amount of a bis-α-hydroxyamine derivative of the formula

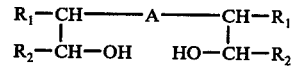

wherein A is a member selected from the group consisting of —NHCO—$R_3$—CONH— and —NHCONH—$R_3$—NHCONH—, $R_1$ and $R_2$ are members selected from the group consisting of hydrogen and alkyl having from 1 to 22 carbon atoms, at least one of $R_1$ and $R_2$ being alkyl and the sum of the carbon atoms in $R_1 + R_2$ is from 8 to 22, and $R_3$ is a bivalent member selected from the group consisting of alkylene having 2 to 10 carbon atoms, phenylene, alkylphenylene having from 1 to 3 carbon atoms in the alkyl and polysiloxane of the formula

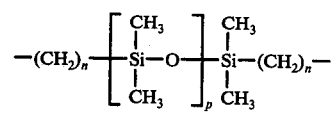

wherein $n$ is an integer from 2 to 3 and $p$ is an integer from 2 to 20.

These and other objects of the invention will become more apparent as the description thereof proceeds.

DESCRIPTION OF THE INVENTION

Accordingly the present invention provides a process for inhibiting foam formation in a liquid which comprises adding to said liquid a bis-α-hydroxyamine derivative of the general formula I

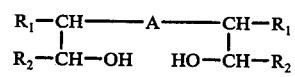

wherein A + —NHCO—$R_3$—CONH— or —NHCONH—$R_3$—NHCONH—, $R_1$ and $R_2$ = H or alkyl radicals of the chain lengths $C_1$-$C_{22}$, the total of the carbon atoms in the radicals $R_1$ and $R_2$ being 8 to 22, in each case, $R_3$ = an alkylene radical of the chain length $C_2$-$C_{10}$ or an aromatic or alkylaromatic radical having 1 to 3 carbon atoms in the alkyl radical, or a polysiloxane radical of the general formula

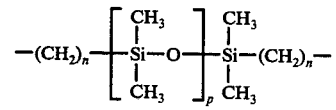

wherein n = 2 to 3 and p = 2 to 20; as well as antifoam compositions of a liquid solution or dispersion containing from 1% to 25%, preferably 5% to 15%, by weight of a bis-α-hydroxyamine derivative of the general Formula I. The bis-α-hydroxyamine derivative of the general Formula I can be added advantageously to organic and aqueous compositions which have a tendency to foam under normal processing conditions (i.e., when agitated with inclusion of air). They are useful in breaking foam which has already formed.

In general, the invention also includes a solution or dispersion wherein the continuous phase is a liquid having a solidification point below 5° C and a boiling point above 80° C, containing therein, in solution or finely-divided form, from 1% to 25% by weight of bis-α-hydroxyamine derivative of the general Formula I.

More particularly, the present invention relates to an antifoam composition of a liquid solution or dispersion containing from 1% to 25% by weight of a bis-α-hydroxyamine derivative of the formula

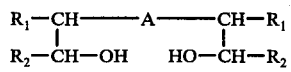

wherein A is a member selected from the group consisting of —NHCO—R$_3$—CONH— and —NHCONH—R$_3$—NHCONH—, R$_1$ and R$_2$ are members selected from the group consisting of hydrogen and alkyl having from 1 to 22 carbon atoms, at least one of R$_1$ and R$_2$ being alkyl and the sum of the carbon atoms in R$_1$ + R$_2$ is from 8 to 22, and R$_3$ is a bivalent member selected from the group consisting of alkylene having 2 to 10 carbon atoms, phenylene, alkylphenylene having from 1 to 3 carbon atoms in the alkyl and polysiloxane of the formula

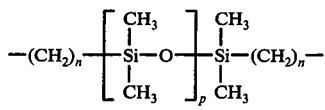

wherein $n$ is an integer from 2 to 3 and $p$ is an integer from 2 to 20; as well as a process for the control of foam in a foamable liquid comprising adding to said foamable liquid an antifoam effective amount of a bis-α-hydroxyamine derivative of the formula

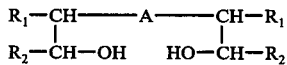

wherein A is a member selected from the group consisting of —NHCO—R$_3$—CONH— and —NHCONH—R$_3$—NHCONH—, R$_1$ and R$_2$ are members selected from the group consisting of hydrogen and alkyl having from 1 to 22 carbon atoms, at least one of R$_1$ and R$_2$ being alkyl and the sum of the carbon atoms in R$_1$ + R$_2$ is from 8 to 22, and R$_3$ is a bivalent member selected from the group consisting of alkylene having 2 to 10 carbon atoms, phenylene, alkylphenylene having from 1 to 3 carbon atoms in the alkyl and polysiloxane of the formula

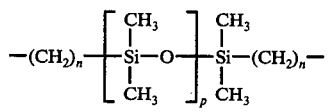

wherein $n$ is an integer from 2 to 3 and $p$ is an integer from 2 to 20.

The bis-α-hydroxyamine derivatives of the general Formula I are manufactured in accordance with known methods. One proceeds from α- or non-terminal olefins of the chain lengths C$_{10}$ to C$_{24}$ such as are obtained, for example, by dehydrogenation of paraffin hydrocarbons or by oligomerization of ethylene, and reacts them with epoxidation agents such as peracetic acid to form the corresponding olefin epoxide. The corresponding α-hydroxyamine is obtained by further reaction with ammonia.

Further reaction to form the derivative is effected with alkanedioic acids of alkane diisocyanates of the chain lengths C$_2$ to C$_{10}$, preferably C$_4$ to C$_6$, such as succinic acid or hexamethylene diisocyanate, or with aromatic dicarboxylic acids, preferably benzene dicarboxylic acid, such as phthalic acid, or alkylbenzene dicarboxylic acids having 1 to 3 carbon atoms in the alkyl, such as toluylene diisocyanate, or with a poysiloxane dicarboxylic acid, the polysiloxane radical containing preferably 5 to 15 siloxane groups. The molar ratios of the reaction components are chosen such that the carboxyl- or isocyanate groups are fully amidified, i.e., 2 mols of α-hydroxyamine are used per 1 mol of dicarboxylic acid or diisocyanate. The reaction products have a waxlike-to-pasty consistency and may be liquid when short chain α-hydroxyamines are used where R$_1$ + R$_2$ is 8 to 10.

Preferably, the defoamers are used in the form of a fine-particulate dispersion in an organic or aqueous liquid. Waxlike defoamers having a melting point in excess of 60° C are particularly suitable for this purpose, although semi-solid or liquid products can be used in the same manner. In addition to water, organic substances, which are liquid at normal temperature and which have an adequately low solidification point or melting point of less than 5° C, are primarily suitable as the liquid phase. A relatively high viscosity is also advantageous, since this contributes to the stabilization of the dispersion. The liquid phase itself can have a defoaming effect or act only as a carrier for the defoamer.

Suitable liquids for the purpose are materials which have boiling points above the melting point of the bis-α-hydroxyamine derivative selected. These include esters of aliphatic acids (which are branched or unsaturated) having 8 to 18 carbon atoms with monovalent or polyvalent alcohols, such as the glycol diester of glycerine triester of oleic acid and oleic oleate, etc., and also branched chain saturated or unsaturated liquid fatty acids and fatty alcohols having 8 to 18 carbon atoms, for example, isotridecyl alcohol and oleyl alcohol, and terpene hydrocarbons, for example, pine oil, oil of turpentine and the like. However, preferable to all of these are mineral oils which have boiling points in excess of 140° C.

It is advantageous to use as the liquid (i.e., continuous) phase non-ionic hydrophobic (i.e., water-insoluble) organic fluids which at elevated temperatures possess a good solvent power for the defoamer but which are substantial non-solvents for these materials at room temperature so that they precipitate the bis-α-hydroxyamine derivatives in finely divided form upon cooling. Liquids of this type render it possible to manufacture the defoaming dispersions in an economical manner by heating the solvent and the antifoam agents together and then rapidly cooling the resulting solution with intensive agitation, whereby an extremely fine-particulate and stable dispersion is obtained. Alternatively, however, it is possible to manufacture the dispersion by stirring the waxy antifoam agents in highly particulate form into the liquid phase at room temperature, or by emulsifying a defoamer in liquid state. The dispersions preferably contain approximately 5% to 15% by weight of the antifoam agent, but may contain a larger or smaller proportion, if desired, from 1% to 25% by weight, as long as the dispersion is of fluid viscosity at normal temperature (20° C to 40° C).

Semi-solid or liquid defoamers, such as are obtained by reacting short chain α-hydroxyamines with dicarboxylic acids or diisocyanates can be added in a dissolved form or as such to the liquids to be defoamed. Suitable solvents are water-soluble alcohols, polyglycols or dioxane.

When a dispersion of the solid bis-α-hydroxyamine derivative in a liquid is employed, the solid particles should be sufficiently small so that the dispersion is substantially self-sustaining at room temperature, i.e., so that the particles do not noticeably cream or settle out during normal storage (two weeks at 20° C). Preferably, the particles are of such size that at room temperature a 1% by weight dispersion of the antifoam in organic liquid or in water possesses an opalescent haze which indicates that the particles are of colloidal dimensions and which exhibits the Tyndall effect. Dispersions of this extreme and very desirable particle size can be attained by passing the dispersion through a colloid mill or homogenizer, and this is specially advantageous when the dispersion medium is water.

The defoamers in accordance with the invention have an excellent defoaming power and can be used with unexpectedly satisfactory results in a number of industrial processes, and also in cases in which the controlling of foam normally presents great difficulties. However, for use in particularly difficult or special fields of application, it can be advantageous to add to the defoamers other known substances having a defoaming action, such a silicone oils, fats, waxes, fatty acids, adducts of ethylene oxide and/or propylene oxide to fatty alcohols, alkylphenols or fatty acids and the like. The defoaming action which can be obtained with combinations of this type is frequently greater than that obtainable with the individual components.

The defoamers can be added directly to the liquids which tend to form foam, preferably in the form of dispersions thereof in organic or aqueous liquids, such as polymeric dispersions, such as polyacrylate, polystyrene, polybutadiene, or polyvinylacetate dispersions. Accordingly, they can also be directly incorporated in aqueous paper-coating compositions or dispersion paints (latex paints). Another possibility of use resides in adding the defoamer at the location where the foam is formed, for example, during the manufacture of paper and cellulose or during the defoaming of waste water. In this case, the foam is controlled by sprinkling or spraying the defoamer in the working range of agitators or pumps, at overflows and the like. The defoamers can also be used in the same manner to control troublesome foam in the food industry, for example, in the production of sugar and yeast, and in fermentation processes. The quantities used depend upon the nature of the relevant substrate and its tendency to foam. Consequently, the metering of the defoamer, particularly during sprinkling or spraying, is adapted to the effect to be obtained. When adding the defoamers to foaming solutions or incorporating them in dyestuff dispersions or polymeric dispersions and the like, the quantities of defoamer required are approximately 0.5 to 10 gm/liter. A suitable amount can be readily determined by trial.

The following examples are illustrative of the invention without being limitative in any respect.

EXAMPLES

Production of the bis-α-hydroxyamine derivatives is shown by Examples 1 to 3.

EXAMPLE 1

446 gm of a non-terminal α-hydroxyamine were placed in a round-bottomed flask provided with an agitator, dropping funnel, thermometer and reflux cooler and, commencing at 80° C, 168 gm of hexamethylene diisocyanate were added, under agitation, drop by drop at a rate at which the reaction temperature could be maintained between 80° C and 85° C. After the hexamethylene diisocyanate had been added, the reaction temperature was increased to 120° C and agitation was continued until isocyanate groups were no longer detectable in the reaction product. The product had a melting range of 84° to 90° C.

The reaction may also be effected in the presence of a portion of the organic liquid used to produce a defoamer dispersion, for example, a mineral oil.

The reaction product corresponds to the general Formula I, given in the description, with the following carbon chain distribution:

$(R_1 + R_2) =$
approximately 20% $C_9$
approximately 30% $C_{10}$
approximately 30% $C_{11}$
approximately 20% $C_{12}$

EXAMPLE 2

123.2 gm of polydimethylsiloxane dicarboxylic acid (corresponding to the general Formula I given in the description, wherein $n = 2$ and $p = 10$) were placed in a round-bottomed flask provided with an agitator, thermometer, gas inlet tube and condenser. 44.6 gm of a non-terminal α-hydroxyamine (having a carbon chain distribution) were added at 50° C under agitation, and the reaction mixture was heated to 200° C under nitrogen and was agitated at this temperature until the acid number had dropped to 10. The α-hydroxyamine had the following carbon chain distribution:

$(R_1 + R_2) =$
approximately 25% $C_{13}$
approximately 30% $C_{14}$
approximately 30% $C_{15}$
approximately 15% $C_{16}$ A defoamer of pasty consistency was obtained.

EXAMPLE 3

73 gm of adipic acid and 223 gm of an α-hydroxyamine corresponding to Example 1 were placed in round-bottomed flask provided with an agitator, thermometer and condenser, and were slowly heated until a stirrable melt was obtained. The mixture was gradually heated to 200° C while being purged with nitrogen and was agitated until the acid number of the reaction mixture had dropped below 5. After cooling, approximately 270 gm of a slightly yellow, waxlike defoamer were obtained.

Production of defoamer dispersions is shown by Examples 4 to 6.

EXAMPLE 4

895 parts by weight (PW) of mineral oil ($D_{15°} = 0.901$ $\eta^{20} = 32$ cSt, solidification point $-15°$ C) were heated to approximately 90° C in a stirring mechanism having a high-speed agitator. 70 PW of the defoamer in accordance with Example 1, 30 PW of a polyalkylene glycol (57% propylene oxide, 43% ethylene oxide, molar weight 3,500) esterified with stearic acid and 5.0 PW of aluminum stearate were stirred into the heated oil until a homogeneous solution was produced. The mixture was then cooled at normal temperature.

EXAMPLE 5

A defoamer dispersion was produced in the same manner with the defoamer described in Example 2.

EXAMPLE 6

A defoamer dispersion was produced in the same manner with the condensation product described in Example 3.

EXAMPLE 7

Defoaming a Dispersion Paint

A dispersion paint was manufactured in accordance with the following formulation with the use of polyacrylate dispersions and the defoamer dispersion of Examples 4, 5 and 6, respectively:

|  | Parts by Weight |
|---|---|
| Propyleneglycol-1,2 | 65.2 |
| Aqueous sodium polyacrylate solution, 25% | 14.0 |
| Antifoaming agent in accordance with one of Examples 4, 5, 6, respectively | 4.7 |
| Water | 18.6 |
| Titanium oxide | 256.0 |
| Water | 46.6 |
| Aqueous polyacrylate dispersion, 46% to 47% $\eta 25 = 1000$ cP$_{25}$. | 509.0 |
| Tributylphosphate | 17.1 |
| Preservative | 2.8 |
| Antifoaming agent in accordance with one of Examples 4, 5, and 6, respectively | 4.7 |
| Ammonia (25%) | 2.0 |
| Propyleneglycol-1,2 | 28.0 |
| Ammonium polyacrylate solution, 22% | 9.3 |
| Water | 22.0 |
|  | 1,000.0 PW |

The constituents listed above were mixed in a Dissolver in the given sequence, with the exception of the preservative which had previously been dissolved in tributylphosphate, and the 22% ammonium polyacrylate solution which had previously been diluted with water.

TESTING THE FOAMING BEHAVIOR

80 PW of the paint were mixed with 20 PW of water and agitated in a Dissolver (diameter of the dispersion disc = 40 mm) for one minute at 2,000 r.p.m. and one minute at 3,000 r.p.m. 50 ml of the paint were subsequently weighed out. The higher the weight of the sample, the lower is the content of air and, consequently, the better the action of the defoamer used.

The paints were further tested in an application test. The dispersion paint, diluted with water in the ratio 80:20, was agitated in a Dissolver for one minute at 2,000 r.p.m.

The smooth sides of pieces of hard fiberboard having the dimensions 20 × 30 × 0.4 cm were sealed by applying a plastics lacquer dispersion, diluted in the ratio 1:1, by means of a brush. 60 to 70 gm of the paint agitated in the Dissolver were then applied to the piece of hard fiberboard and were uniformly distributed by means of a foam roller such that 15 gm of wet paint, corresponding to 250 gm/m², remained.

The foam roller had a width of 6 cm and a diameter of 7 cm. It was made from open-pore polyurethane foam. When using a roller of this type, air is additionally incorporated in the coating in the same manner which occurs, to a lesser extent, when applying the coating by means of a brush.

In the evaluation of the coating film in the following Table, 1 indicates that the film of paint has a very large number of flaws caused by air bubbles. The value 6 indicates that the coating has dried completely without air bubbles.

|  | Weight in 50 ml in gm | Value in Application Test |
|---|---|---|
| Blank value (paint without defoamer) | 43.2 | 1 |
| Paint with defoamer, Example 4 | 59.8 | 4 |
| Paint with defoamer, Example 5 | 58.5 | 4 |
| Paint with defoamer, Example 6 | 53.1 | 4.5 |

EXAMPLE 8

Testing the Foaming Behavior of Molasses Solutions

The effect of defoamers on solutions occurring in the sugar and yeast industry can be tested in the laboratory in the following manner.

A two-liter measuring cylinder is filled with 500 ml of molasses diluted with water in the ratio 1:4. The solution is drawn from the bottom of the measuring cylinder with a glass tube by means of a laboratory hose pump. The liquid is returned by way of a second tube whose bottom end is located on a level with the top edge of the measuring cylinder. The liquid is circulated at a speed of four liters per minute and returns into the measuring cylinder. In order to maintain a constant temperature, the measuring cylinder is located in a water bath adjusted to 25° C.

A substantially constant level of foam is established in the measuring cylinder after the pump has been running for a short period of time. The total volume of liquid and foam which has been read off, reduced by the volume of liquid initially measured, is given as the measured value. After standardizing the blank value relative to the quantity of molasses, 0.01% by weight of defoamer is added from a micropipette, and the fresh level of foam now established is measured at varying intervals of time.

895 PW of oleyl alcohol (iodine number 80/85) were heated to approximately 90° C in a high-speed agitator. 100 PW of the defoamer of Example 1 and 5 PW of aluminium stearate were stirred into the heated alcohol until a homogeneous solution was obtained, and then the mixture was cooled rapidly to normal temperature.

0.01% by weight of the defoamer was added to a 1:4 diluted molasses solution and following foam levels were observed:

| Blank Value | 0.5 | 1 | 2 | 3 | 5 | 10 | 20 min. |
|---|---|---|---|---|---|---|---|
| 1,580 | 80 | 80 | 100 | 120 | 180 | 500 | 1,000 ml |

It can be seen that a substantial defoaming effect was observed which had a practically instantaneous onset and lasted for more than 10 minutes.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the control of foam in a foamable liquid comprising adding to said foamable liquid an antifoam effective amount of a bis-α-hydroxyamine derivative of the formula

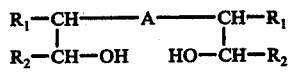

wherein A is a member selected from the group consisting of —NHCO—R$_3$—CONH— and —NHCONH—R$_3$—NHCONH—, R$_1$ and R$_2$ are members selected from the group consisting of hydrogen and alkyl having from 1 to 22 carbon atoms, at least one of R$_1$ and R$_2$ being alkyl and the sum of the carbon atoms in R$_1$ + R$_2$ is from 8 to 22, and R$_3$ is a bivalent member selected from the group consisting of alkylene having 2 to 10 carbon atoms, phenylene, alkylphenylene having from 1 to 3 carbon atoms in the alkyl and polysiloxane of the formula

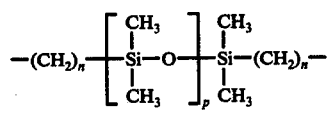

where n is an integer from 2 to 3 and p is an integer from 2 to 20.

2. The process of claim 1 wherein A is —NHCONH—R$_3$—NHCONH— and R$_3$ is alkylene having 2 to 10 carbon atoms.

3. The process of claim 1 wherein A is —NHCO—R$_3$—CONH— and R$_3$ is said polysiloxane.

4. The process of claim 1 wherein A is —NHCO—R$_3$—CONH— and R$_3$ is alkylene having 2 to 10 carbon atoms.

5. The process of claim 1 wherein said bis-α-hydroxyamine derivative is in the form of a dispersion in an organic liquid selected from the group consisting of a mineral oil having a boiling point in excess of 140° C and oleyl alcohol.

6. An antifoam composition of a liquid solution or dispersion containing from 1% to 25% by weight of a bis-α-hydroxyamine derivative of the formula

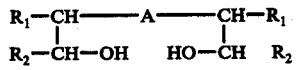

wherein A is a member selected from the group consisting of —NHCO—R$_3$—CONH— and —NHCONH—R$_3$—NHCONH—, R$_1$ and R$_2$ are members selected from the group consisting of hydrogen and alkyl having from 1 to 22 carbon atoms, at least one of R$_1$ and R$_2$ being alkyl and the sum of the carbon atoms in R$_1$ + R$_2$ is from 8 to 22, and R$_3$ is a bivalent member selected from the group consisting of alkylene having 2 to 10 carbon atoms, phenylene, alkylphenylene having from 1 to 3 carbon atoms in the alkyl and polysiloxane of the formula

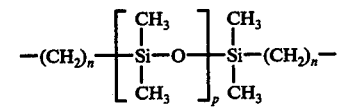

where n is an integer from 2 to 3 and p is an integer from 2 to 20.

7. The antifoam composition of claim 6 wherein A is —NHCONH—R$_3$—NHCONH— and R$_3$ is alkylene having 2 to 10 carbon atoms.

8. The antifoam composition of claim 6 wherein A is —NHCO—R$_3$—CONH— R$_3$ is said polysiloxane.

9. The antifoam composition of claim 6 wherein A is —NHCO—R$_3$—CONH— and R$_3$ is alkylene having 2 to 10 carbon atoms.

10. The antifoam composition of claim 6 wherein said bis-α-hydroxyamine derivative is in the form of a solution or fine-particulate dispersion in an aqueous or organic liquid having a melting point of less than 5° C.

11. The antifoam composition of claim 10 wherein said organic liquid is a mineral oil having a boiling point in excess of 140° C, or oleyl alcohol.

12. The antifoam composition of claim 6 wherein said bis-α-hydroxyamine derivative is present in an amount of from 5% to 15% by weight.

13. A process for the production of a dispersion of a bis-α-hydroxyamine derivative of the formula

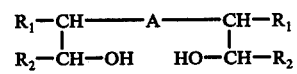

wherein A is a member selected from the group consisting of —NHCO—R$_3$—CONH— and —NHCONH—R$_3$—NHCONH—, R$_1$ and R$_2$ are members selected from the group consisting of hydrogen and alkyl having from 1 to 22 carbon atoms, at least one of R$_1$ and R$_2$ being alkyl and the sum of the carbon atoms in R$_1$ + R$_2$ is from 8 to 22, and R$_3$ is a bivalent member selected from the group consisting of alkylene having 2 to 10 carbon atoms, phenylene, alkylphenylene having from 1 to 3 carbon atoms in the alkyl and polysiloxane of the formula

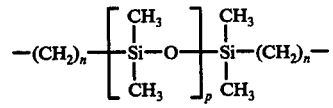

where n is an integer from 2 to 3 and p is an integer from 2 to 20 in an organic liquid having a melting point of less than 5° C and a boiling point above the melting point of said bis-α-hydroxyamine derivative, said organic liquid being a solvent for said bis-α-hydroxyamine derivative when melted which consists of the steps of heating a mixture of said organic liquid and from 1% to 25% by weight of said bis-α-hydroxyamine derivative to above its melting point and then cooling the mixture under extensive agitation.

14. A bis-α-hydroxyamine derivative of the formula

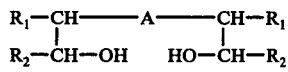

wherein A is a member selected from the group consisting of —NHCO—R$_3$—CONH— and —NHCONH—R$_3$—NHCONH—, R$_1$ and R$_2$ are members selected from the group consisting of hydrogen and alkyl having from 1 to 22 carbon atoms, at least one of R$_1$ and R$_2$ being alkyl and the sum of the carbon atoms in R$_1$ + R$_2$ is from 8 to 22, and R$_3$ is a bivalent member selected from the group consisting of alkylene having 2 to 10 carbon atoms, phenylene, alkylphenylene having from 1 to 3 carbon atoms in the alkyl and polysiloxane of the formula

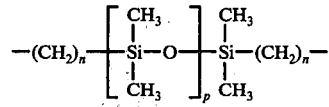

where $n$ is an integer from 2 to 3 and $p$ is an integer from 2 to 20.

15. The bis-α-hydroxyamine derivative of claim 14 wherein A is —NHCONH—R$_3$—NHCONH— and R$_3$ is alkylene having 2 to 10 carbon atoms.

16. The bis-α-hydroxyamine derivative of claim 14 wherein A is —NHCO—R$_3$—CONH— and R$_3$ is said polysiloxane.

17. The bis-α-hydroxyamine derivative of claim 14 wherein A is —NHCO—R$_3$—CONH— R$_3$ is alkylene having 2 to 10 carbon atoms.

* * * * *